(12) United States Patent
Formaggio

(10) Patent No.: US 12,011,747 B2
(45) Date of Patent: Jun. 18, 2024

(54) FEEDING AND DOSING APPARATUS FOR IRRECOVERABLE UNSORTED WASTE

(71) Applicant: ECOMADE ENGINEERING S.R.L., Este (IT)

(72) Inventor: Daniele Formaggio, Este (IT)

(73) Assignee: ECOMADE ENGINEERING S.R.L., Este (IT)

( * ) Notice: Subject to any disclaimer, the term of this patent is extended or adjusted under 35 U.S.C. 154(b) by 0 days.

(21) Appl. No.: 17/996,381

(22) PCT Filed: Apr. 15, 2021

(86) PCT No.: PCT/IB2021/053104
§ 371 (c)(1),
(2) Date: Oct. 17, 2022

(87) PCT Pub. No.: WO2021/209938
PCT Pub. Date: Oct. 21, 2021

(65) Prior Publication Data
US 2023/0219122 A1    Jul. 13, 2023

(30) Foreign Application Priority Data
Apr. 16, 2020  (IT) .................. 102020000008068

(51) Int. Cl.
*B07B 13/16* (2006.01)
*B09B 3/30* (2022.01)
(Continued)

(52) U.S. Cl.
CPC ............... *B09B 3/30* (2022.01); *B07B 13/16* (2013.01); *B65G 33/18* (2013.01); *B09B 2101/75* (2022.01)

(58) Field of Classification Search
CPC ......... B09B 3/30; B09B 2101/75; B09B 3/00; B07B 13/16; B65G 33/18; B03B 2011/008
(Continued)

(56) References Cited

U.S. PATENT DOCUMENTS

| 4,079,863 | A | * | 3/1978 | Bouyer | ................. B65D 88/68 222/413 |
| 5,630,944 | A | * | 5/1997 | Terblanche | ........... C05F 17/971 210/768 |
| 5,871,619 | A | * | 2/1999 | Finley | ..................... C10B 33/02 198/545 |

(Continued)

FOREIGN PATENT DOCUMENTS

| CN | 209415461 U | * | 9/2019 | ............... B02C 4/08 |
| CN | 209616411 U | * | 11/2019 | |

(Continued)

OTHER PUBLICATIONS

International Search Report & Written Opinion dated Aug. 30, 2021 from PCT Application No. PCT/IB2021/053104.

*Primary Examiner* — Gene O Crawford
*Assistant Examiner* — Muhammad Awais
(74) *Attorney, Agent, or Firm* — INNOVATION CAPITAL LAW GROUP, LLP; Vic Lin

(57) ABSTRACT

An irrecoverable-waste feeding and metering apparatus for feeding a waste separator, comprising: —a loading hopper having a mixing compartment and a discharge duct which extends between the mixing compartment and a discharge mouth thereof, for discharging material from the latter; —a central auger and two lateral augers; the central auger extending into the discharge duct and into the mixing compartment and the lateral augers are arranged inside the mixing compartment each on one side of the central auger; —a transfer device having a feed channel which has a loading portion and a feeding portion. The transfer device (Continued)

comprises two transfer augers extending from the loading portion along the feed channel and which each have a first helicoid.

The first helicoid of a first transfer auger has a direction opposite to that of the first helicoid of the second transfer auger.

20 Claims, 2 Drawing Sheets

(51) Int. Cl.
    *B65G 33/18*     (2006.01)
    *B09B 101/75*     (2022.01)

(58) Field of Classification Search
    USPC .......................................................... 209/261
    See application file for complete search history.

(56) References Cited

U.S. PATENT DOCUMENTS

| | | | | |
|---|---|---|---|---|
| 6,976,819 B2 * | 12/2005 | Kulbeth | ................ | B65G 65/46 414/326 |
| 7,708,131 B2 * | 5/2010 | Muth | ................... | B65G 41/002 198/315 |
| 9,486,811 B2 * | 11/2016 | Weber | ..................... | B03B 11/00 |
| 9,643,787 B1 * | 5/2017 | Carteri | ................... | B65G 33/34 |
| 2004/0208732 A1 * | 10/2004 | Kulbeth | ................. | B65G 65/46 414/326 |
| 2005/0155845 A1 * | 7/2005 | Webb | ..................... | B65G 65/46 198/669 |
| 2006/0209143 A1 * | 9/2006 | Morriss | ................... | B29B 17/02 347/86 |
| 2008/0116039 A1 * | 5/2008 | Ainsworth | ............... | B27N 3/14 198/657 |
| 2010/0193411 A1 * | 8/2010 | Redekop | ................... | B07B 4/02 209/509 |
| 2014/0086721 A1 * | 3/2014 | Wehrle | ................... | B65G 33/32 414/809 |
| 2017/0312755 A1 * | 11/2017 | Marchesini | ............. | B03B 9/063 |

FOREIGN PATENT DOCUMENTS

| | | | | |
|---|---|---|---|---|
| DE | 10200599 A1 * | 7/2003 | ......... | B01D 21/2405 |
| DE | 202005017280 U1 * | 2/2006 | ............. | A01C 3/066 |
| WO | 2016079635 A1 | 5/2016 | | |

\* cited by examiner

FEEDING AND DOSING APPARATUS FOR IRRECOVERABLE UNSORTED WASTE

TECHNICAL SECTOR

The present invention relates to an apparatus for feeding and metering irrecoverable waste, in particular to a separator, especially intended for dry treatment, which is able to ensure a moisture level of the overscreen fraction at the discharge outlet of the separator, which is much less than that obtained nowadays by means of conventional methods.

PRIOR ART

Nowadays it is known to perform the separation of the irrecoverable waste by means of an apparatus, called a separator, which is able to divide said waste in turn into an overscreen fraction and underscreen fraction.

Said underscreen fraction consists of a mainly wet organic fraction intended for treatment by means of a digester or composting.

The overscreen fraction, instead, consists mainly of plastic material.

In order to facilitate the treatment of the irrecoverable-waste overscreen fraction nowadays streams of water supplied by pumps are used.

Although the use of water makes the treatment of the irrecoverable-waste overscreen fraction easier, this generally increases the moisture present in the overscreen fraction to be disposed of, the disposal costs of which depend substantially on the weight thereof and therefore the water fraction present therein.

A feeding and metering apparatus, which is nowadays known, comprises a hopper inside which the irrecoverable waste is fed.

Three parallel augers are arranged on the bottom of the hopper, i.e. a central auger, with a double helix, and two discharge augers, which are arranged on the two opposite sides of the central auger.

The bottom of the hopper has two discharge ducts, into each of which one end of one of the discharge augers extends.

During operation, the irrecoverable waste is loaded into the centre of the hopper in order to avoid the dispersion thereof outside of the latter and the central auger therefore has the function of distributing said waste towards its opposite ends.

The irrecoverable waste distributed by the central auger is then pushed by the discharge augers through the discharge ducts.

A transfer device is designed to transfer, towards a separator, the irrecoverable waste discharged from the hopper.

This transfer device comprises a channel which has a first end located underneath the discharge ducts, for receiving material from the latter, and a second end situated above a loading mouth of the separator, for feeding the latter.

A transfer auger is arranged inside the channel and during operation transfers the irrecoverable waste from its first end to its second end, discharging it into the separator.

This transfer auger has a diameter of about 500 mm which is substantially determined by the dimensions of the loading mouth of the separator.

This conventional feeding and metering apparatus, however, has a number of drawbacks.

In fact, inside the hopper, the combined effect of the central auger and said transfer augers tend to cause non-optimal mixing of the irrecoverable waste; also there is a significant risk of the material becoming packed inside the discharge ducts which however may have a throughput of sorted material.

The presence of objects with a high hardness in the irrecoverable waste may cause blockages of or damage to the transfer augers, thereby negatively affecting productivity.

Furthermore, inside the transfer device, plastic products tend to become entangled around the transfer auger and this results in the risk of clogging of the said transfer device or a substantial reduction in the transfer throughput thereof.

SUMMARY OF THE INVENTION

The problem underlying the present invention is therefore that of improving the productivity of an apparatus for feeding and metering conventional irrecoverable waste, while maintaining a simple structure which can be adapted to plants already in use.

The task of an irrecoverable-waste feeding and metering apparatus according to the present invention is therefore that of solving this problem.

In connection with this task, one object of the invention is to propose an irrecoverable-waste feeding and metering apparatus which is less sensitive to the presence of bulky high-hardness bodies inside the irrecoverable waste to be processed, while having a feeding performance which is competitive compared to conventional solutions.

In connection with this task, an object of the invention is to provide an irrecoverable-waste feeding and metering apparatus which reduces the need for maintenance due to entanglement of plastic material inside the augers.

Another object of the present inventio is to propose an irrecoverable-waste feeding and metering apparatus which may be easily integrated within a waste treatment plant already in use without requiring substantial adaptation or modification of the latter.

This task, as well as these and other objects which will become clearer below, are achieved by an irrecoverable-waste feeding and metering apparatus according to the attached independent claim.

Detailed characteristic features of an irrecoverable-waste feeding and metering apparatus according to the invention are described in the dependent claims.

Further characteristic features and advantages will emerge more clearly from the description of a preferred, but non-exclusive embodiment of an irrecoverable-waste feeding and metering apparatus according to the invention, illustrated in an embodiment thereof provided solely by way of a non-limiting example in the attached sets of drawings listed below.

BRIEF DESCRIPTON OF THE DRAWINGS

DETAILED DESCRIPTION

Figure 1:
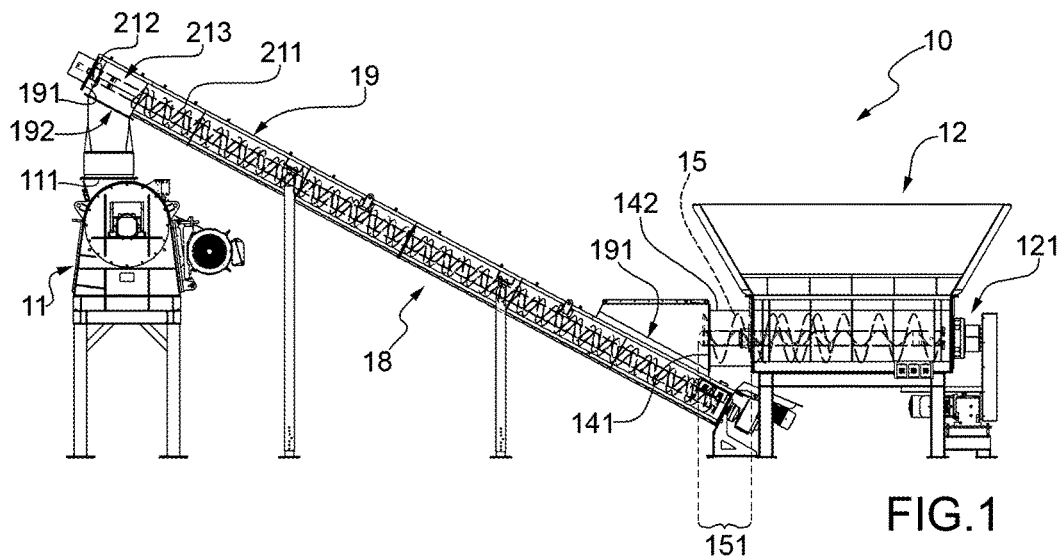
FIG. 1 shows a schematic front elevation view of an irrecoverable-waste feeding and metering apparatus according to the present invention.
Figure 2:
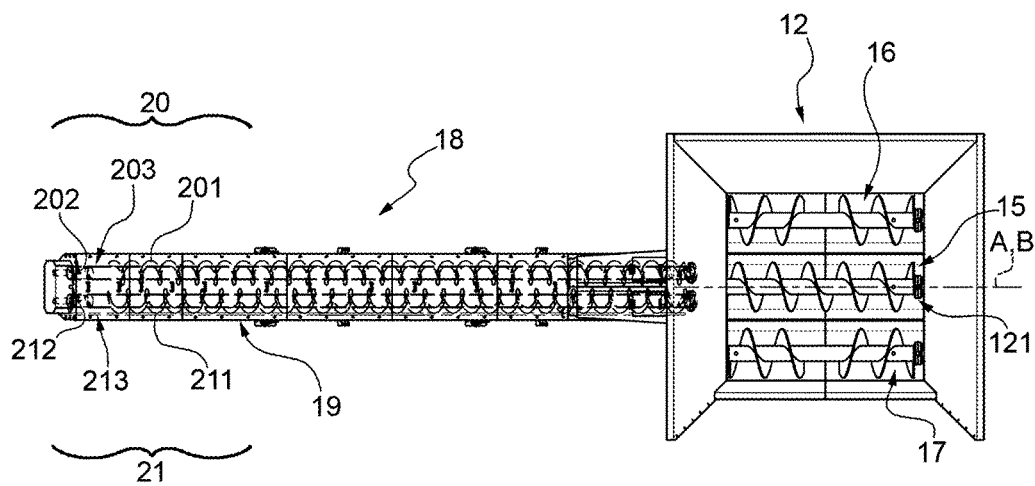
FIG. 2 shows a top plan view of the irrecoverable-waste feeding and metering apparatus according to the present invention.

With particular reference to the said figures, 10 denotes overall an irrecoverable-waste feeding and metering apparatus for feeding a waste separator, where the apparatus 10 comprises:

- a loading hopper 12 having a mixing compartment 13 and a discharge duct 14 which extends between the mixing compartment 13 and a discharge mouth 141 thereof, for discharging material from the latter;
- a central auger 15 and two lateral augers 16 and 17; where the central auger 15 extends into the discharge duct 14 and into the mixing compartment 13 and the lateral augers 16 and 17 are arranged inside the mixing compartment 13, each on one side of the central auger 15;
- a transfer device 18 which has a feed channel 19 which has a loading portion 191 and a feeding portion 192.

The transfer device 18 comprises two transfer augers 20, 21 which are mutually parallel, namely the helicoids of the transfer augers 20 and 21 extend along axes which are substantially parallel, namely which may be inclined at an angle of not more than 3°.

The transfer augers 20, 21 extend from the loading portion 191 along the feed channel 19 and each have a first helicoid 201, 211.

The first helicoid 201 of a first one 20 of the transfer augers 20, 21 has a direction opposite to that of the first helicoid 211 of the second one 21 of the transfer augers 20, 21.

The loading portion 191 faces the discharge mouth 141 of the discharge duct 14 so as to receive material from the latter.

The central auger 15 and the lateral augers 16 and 17 may each have a single helicoid or may consist of a single helicoid which extends over the whole of their extension, or a part thereof, without interruption.

Moreover, the helicoids of the central auger 15 and/or of the lateral augers 16 and 17 may have a uniform pitch or varying pitch along their extension.

For example, the central auger 15 may have a first portion 151 which engages with the discharge duct 14 and which has a pitch of the helicoid which is smaller than the pitch of the helicoid of the remainder of the central auger 15, or the first portion 151 may have a first helical section which has a pitch smaller than that of a second helicoid section which extends over the remainder of the central auger 15 and which is independent of the said first section.

The outer diameter of the helicoids of the central auger 15 and of the lateral augers 16 and 17 may be substantially the same and may have a value of between 700 mm and 500 mm and preferably equal to 700 mm.

The central auger 15 and the lateral augers 16 and 17 may be fixed to the hopper 12 in a rotatable manner with respect to the axes which may lie substantially in a same plane.

The hopper 12 is configured so that, when it rests on a horizontal surface, said surface is substantially horizontal.

Operational tests have shown that an apparatus 10 according to the present invention is able to reduce greatly the recovery downtime following clogging of an auger or entanglement of plastic material around it.

In fact the arrangement of the central auger 15 and the lateral augers 16 and 17 in the hopper allow more efficient and controllable feeding of the material to the transfer device, in particular avoiding the risks of blockage due to hard and bulky bodies which, in conventional apparatus, tend to block or damage an auger and/or a discharge duct into which the auger extends.

The discharge duct 14 has a development axis B and the central auger 15 has an operating axis A along which it extends and about which it is rotatable.

The central auger 15 may be fixed to the hopper 12 so that the operating axis A is inclinable with respect to the development axis B of the discharge duct 14 so as to adapt a configuration of the central auger 15 inside the discharge duct 14 in the presence of bulky and high-hardness objects present in the material pushed by the central auger 15 through the discharge duct 14.

Figure 3:
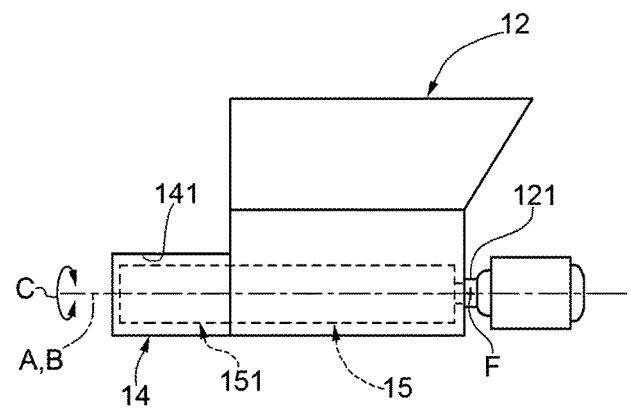
FIG. 3 shows a schematic side view of a detail of an irrecoverable-waste feeding and metering apparatus according to the present invention, relating to a hopper.
Figure 4:
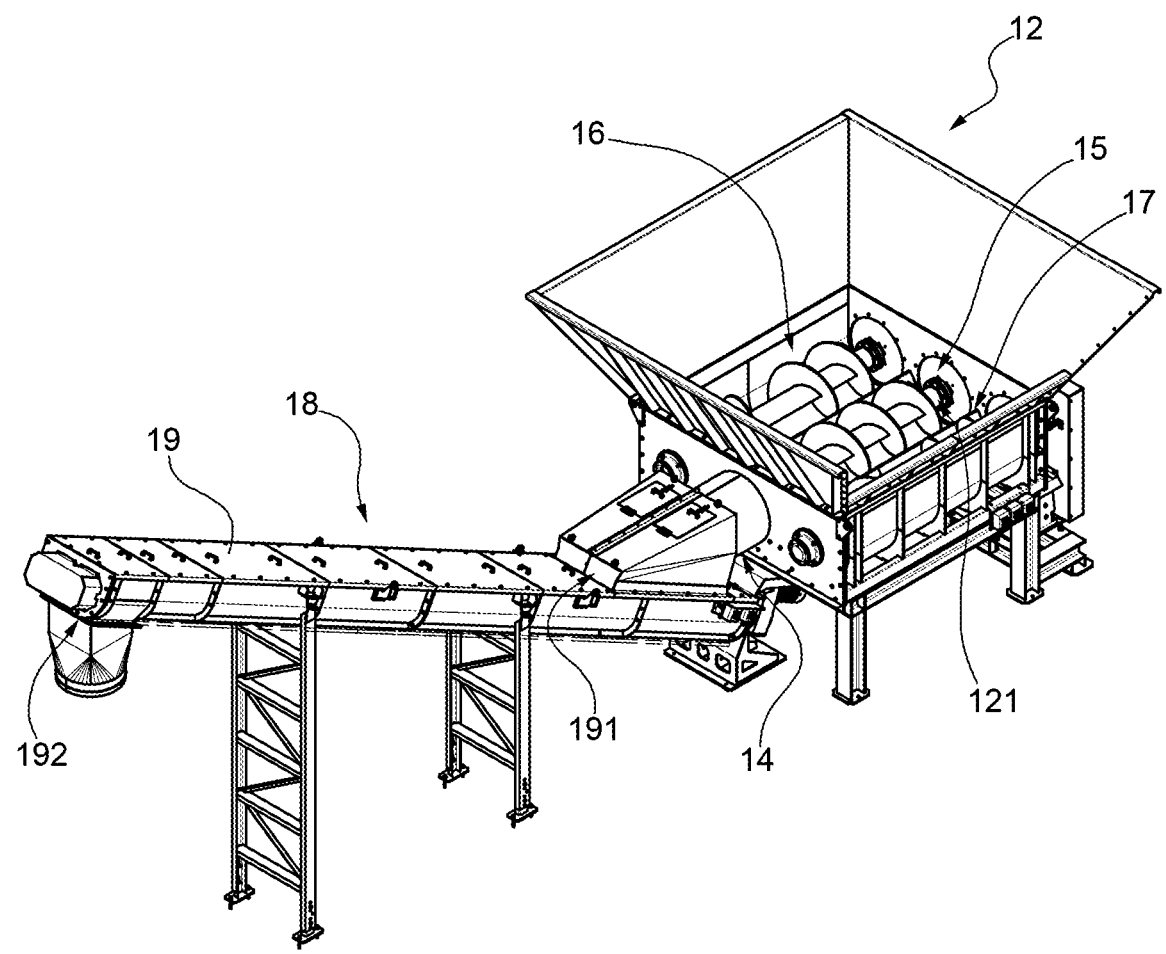
FIG. 4 shows a perspective view of the irrecoverable-waste feeding and metering apparatus according to the present invention.

In particular, the apparatus 10 may comprise a support 121 which connects the central auger 15 to the hopper 12, where the support 121 is configured to define a fulcrum F for the central auger 15, with respect to which the latter is tiltable, for example as shown in FIG. 3, in relation to the oscillation C in the plane of the sheet.

This fulcrum F may lie on the development axis B of the discharge duct 14 so as to ensure maximum flexibility of adaptation of the central auger 15 with respect to the discharge duct 14 in the event of bulky and hard or substantially rigid objects.

For example, the support 121 may comprise a directionally adjustable bearing which may be, for example, of the barrel-roller type.

Thus, in fact, should a bulky and substantially hard object be present in the material processed by the central auger 15, the central auger 15 may assume an inclined and/or axially offset position with respect to the discharge duct 14, allowing the transfer of such an object to the transfer device 18 without the risk of damage to itself or damage to the discharge duct 14.

Moreover, the two transfer augers 20 and 21 may be counter-rotating; in this way any bulky objects may float on the rest of the material without being drawn between the transfer augers 20 and 21 or between one of these and the walls of the feed channel 19, avoiding possible damage or clogging.

The discharge duct 14 has an internal wall 142 which may be cylindrical and which may have a diameter of between 550 mm and 800 mm.

The central auger 15 may have the first portion 151 which extends through the discharge duct 14 and which has an external diameter of between 500 mm and 700 mm.

In general, the difference between the diameter of the internal wall 142 and the diameter of the first portion 151 is between 50 mm and 100 mm and preferably is equal to about 10% of the diameter of the central auger 15 in order to allow a high degree of adaptability to bulky and hard and/or rigid objects.

The operating axis A of the central auger 15 may be inclinable with respect to the development axis B of the discharge duct 14 through an angle preferably of between 1° and 2° and in any case not greater than 5°.

The apparatus 10 may comprise means for operating the central auger 15 and said lateral augers 16 and 17, for example comprising corresponding electric motors, which are configured and/or set so that, during operation, the central auger 15 pushes material present inside the hopper 12 in a first direction which is directed towards the discharge mouth 141, while the lateral augers 16 and 17 push material in a second direction which is opposite to the first direction or the lateral augers may each have two helicoids operating in opposite directions so as to distribute the material from the centre towards the outside, or conversely, the material introduced into the hopper 12.

In this way an optimum distribution of the material inside the hopper is obtained so as to ensure easy feeding of the material to be metered and controlled towards the conveyor 18.

In the transfer device 18, a first one 16 of the lateral augers 16 and 17 may have a helicoid which has an opposite direction to that of a helicoid of the second one 17 of the lateral augers 16 and 17.

The first helicoid 201, 2011 of the transfer augers 20, 21 may have a diameter of between 250 mm and 500 mm and preferably equal to 350 mm; in this way the transfer device 18 is particularly adaptable for standard plants already in use where a separator 11 generally has a loading opening with a width or diameter of about 400 mm or 500 mm.

Each of the transfer augers 20 and 21 may have its helicoid wound around a shaft having a diameter of between 140 mm and 180 mm and preferably equal to 160 mm.

In this way, the material which is introduced into the conveyor 18 by the central auger 15, which tends to pack it into blocks having a volume proportional to the throughspace defined by the central auger 15 and by the discharge duct 14, is mixed up and reduced into blocks which are smaller size, namely proportional to the free space present within the helix of the transfer augers 20 and 21, determined by the difference between the diameter of the shaft, for example equal to 160 mm, and the diameter of the helicoid, for example equal to 350 mm.

The difference in dimensions of the transfer augers 20 and 21 with respect to the central auger 15 ensures, advantageously but not necessarily in combination with the different operating speeds which will be described below, that the separator 11 is fed with material which is substantially less densely packed, compared to conventional plants, thus avoiding the use of water jets, as in conventional plants, and obtaining at the separator 11 an overscreen fraction which is already clean and underscreen fraction which is drier and therefore having a specific weight which is much less than that obtainable with conventional plants.

The apparatus 10 comprises means for operating the transfer augers 20, 21 which may be configured or set to operate them at a rotation speed of between 35 rpm and 45 rpm and preferably equal to 40 rpm, preferably in mutually opposite directions of rotation so as to facilitate the floating of bulky products and especially light products, typically containers made of plastic material, above the material being pushed by the transfer augers 20 and 21 and above the latter. The means for operating the central auger 15, and optionally for operating also the lateral augers 16, 17, are configured and/or set so as to operate it at a rotation speed of between 8 rpm and 10 rpm.

Thus, the difference in operating speed of the central augers 15 and the lateral augers 16, 17, optionally but not necessarily combined with the aforementioned dimensional differences, is able to ensure that the separator 11 is fed with a material which is substantially less densely packed, compared to conventional plants, thus making it possible to avoid using water jets, as in conventional plants, and obtaining at the discharge outlets of the separator 11 an overscreen fraction which is already clean and an underscreen fraction which is drier and therefore having a specific weight which is much less than that which can be obtained with conventional plants.

The transfer augers 20, 21 may also have a second helicoid 202, 212 and a helicoid-free section 203, 21.

Each of the transfer augers 20, 21 may have its first helicoid 201, 211 which has a direction opposite to that of its second helicoid 202, 212.

The transfer augers 20, 21 may also have the first helicoid 201, 211 which extends from the loading portion 191 to a first end of the feeding portion 192, the helicoid-free section 203, 213 which faces the feeding portion 192 and the second helicoid 202, 212 which extends from a second end of the feeding portion 191, where the second end is opposite to the first end of the feeding portion 192.

In this way, during operation, the combined action of the first helicoid 201, 211 and the second helicoid 202, 212 is that of effectively conveying the material towards the helicoid-free section 203, 213 and, then from the latter, promoting a precise feeding of material through the feeding portion 192 which may be facing, for example situated above a loading opening 111 of a separator 11.

The transfer augers 20, 21 have a longitudinal axis along which they extend and about which they are axially rotatable.

The helicoid-free section 203, 213 extends along said longitudinal axis over a length of between 400 mm and 500 mm.

It can therefore be understood how an irrecoverable-waste feeding and metering apparatus 10 according to the present invention is less sensitive to the presence of bulky high-hardness bodies inside the irrecoverable waste to be processed, while having a feeding performance which is competitive compared to conventional solutions.

An irrecoverable-waste feeding and metering apparatus according to the present invention therefore reduces the need for maintenance work due to entanglement of plastic material in the augers and may be easily integrated in a waste treatment plant already in use, without requiring substantial adaptation or modification of the latter.

Moreover, an irrecoverable-waste feeding and metering apparatus according to the present invention is structurally simple and easy to use.

The invention thus devised may be subject to numerous modifications and variations, all of which fall within the scope of protection of the attached claims. Moreover, all the details may be replaced by other technically equivalent elements.

Where the operational characteristics and the techniques mentioned in the following claims are followed by reference numbers or symbols, these reference numbers or symbols have been assigned with the sole purpose of facilitating understanding of the said claims and consequently they do not limit in any way the interpretation of each element which is identified, purely by way of example, by said reference numbers or symbols.

The invention claimed is:

1. An irrecoverable-waste feeding and metering apparatus (10) comprising:
   a loading hopper (12) having a mixing compartment (13) and a discharge duct (14) which extends between said mixing compartment (13) and its discharge mouth (141), for discharging material from the latter;
   a central auger (15) and two lateral augers (16, 17); where said central auger (15) extends into said discharge duct (14) and into said mixing compartment (13) and said lateral augers (16, 17) are arranged inside said mixing compartment (13) each on one side of said central auger (15);
   a transfer device (18) having a feed channel (19) which has a loading portion (191) and a feeding portion (192); wherein said transfer device (18) comprises two mutually parallel transfer augers (20, 21), which extend from said loading portion (191) along said feed channel (19) and which each have a first helicoid (201, 211); where the first helicoid (201) of a first one (20) of said transfer augers (20, 21) has a direction opposite to that of the first helicoid (202) of the second one (21) of said transfer augers (20, 21); where said loading portion (191) faces the discharge mouth (141) of said discharge duct (14) in order to receive material from the latter, wherein said discharge duct (14) has a development axis (B) and said central auger (15) has an operating axis (A) along which it extends and about which it is rotatable; said central auger (15) being fixed to said hopper (12) so that the operating axis (A) of said central auger (15) is inclinable with respect to the development axis (B) of said discharge duct (14) so as to adapt an arrangement of said central auger (15) inside said discharge duct (14) in the presence of bulky and high-hardness objects in the material pushed by said central auger (15) through said discharge mouth.

2. The apparatus (10) according to claim 1, which comprises a support (121) which connects said central auger (15) to said hopper (12), said support (121) being configured so as to define a fulcrum (F) for said central auger (15), with respect to which the latter can be tilted; wherein said fulcrum (F) lies on the development axis (B) of said discharge duct (14).

3. The apparatus (10) according claim 1, wherein said discharge duct (14) has a cylindrical internal wall (142) having a diameter of between 550 mm and 800 mm; where said central auger (15) has a first portion (151) which extends through said discharge duct (14) and which has an external diameter of between 500 mm and 700 mm; where the difference between the diameter of said internal wall (142) and the diameter of said first portion (151) is between 50 mm and 100 mm.

4. The apparatus (10) according to claim 1, wherein the operating axis (A) of said central auger (15) is inclinable with respect to the development axis (B) of said discharge duct (14) through an angle of not more than 5°.

5. The apparatus (10) according to claim 1, which comprises means for operating said central auger (15) and said lateral augers (16, 17) which are configured and/or set in such a way as to operate said central auger (15) at a rotation speed of between 8 rpm and 10 rpm.

6. The apparatus (10) according to claim 1, wherein the first helicoid (201, 211) of said transfer augers (20, 21) has a diameter of between 250 mm and 500 mm.

7. The apparatus (10) according to claim 1, which comprises means for operating said transfer augers (20, 21) at a rotation speed of between 35 rpm and 45 rpm.

8. The apparatus (10) according to claim 1, wherein said transfer augers (20, 21) have a second helicoid (202, 212) and a helicoid-free section (203, 213), wherein each of said transfer augers (20, 21) has its first helicoid (201, 211) which has an opposite direction to that of its second helicoid (202, 212); said transfer augers (20, 21) have said first helicoid (201, 211) which extends from said loading portion (191) to a first end of said feeding portion (192), said helicoid-free section (203, 213) which faces said feeding portion (192) and said second helicoid (202, 212) which extends from a second end of said feeding portion (192), where said second end is opposite to said first end.

9. The apparatus (10) according to claim 8, wherein said transfer augers (20, 21) have a longitudinal axis along which they extend and about which they are axially rotatable; said helicoid-free section (203, 213) extends along said longitudinal axis over a length of between 400 mm and 500 mm.

10. The apparatus (10) according to claim 1, wherein the operating axis (A) of said central auger (15) is inclinable with respect to the development axis (B) of said discharge duct (14) through an angle between 1° and 2°.

11. The apparatus (10) according to claim 1, wherein the first helicoid (201, 211) of said transfer augers (20, 21) has a diameter of 350 mm.

12. The apparatus (10) according to claim 1, which comprises means for operating said transfer augers (20, 21) at a rotation speed of between 35 rpm and 45 rpm in mutually opposite directions of rotation.

13. The apparatus (10) according to claim 1, which comprises means for operating said transfer augers (20, 21) at a rotation speed of 40 rpm.

14. The apparatus (10) according to claim 8, wherein said transfer augers (20, 21) have a longitudinal axis along which they extend and about which they are axially rotatable; said helicoid-free section (203, 213) extends along said longitudinal axis over a length of 400 mm.

15. An irrecoverable-waste feeding and metering apparatus (10) comprising:
a loading hopper (12) having a mixing compartment (13) and a discharge duct (14) which extends between said mixing compartment (13) and its discharge mouth (141), for discharging material from the latter;
a central auger (15) and two lateral augers (16, 17); where said central auger (15) extends into said discharge duct (14) and into said mixing compartment (13) and said lateral augers (16, 17) are arranged inside said mixing compartment (13) each on one side of said central auger (15);
a transfer device (18) having a feed channel (19) which has a loading portion (191) and a feeding portion (192); wherein said transfer device (18) comprises two mutually parallel transfer augers (20, 21), which extend from said loading portion (191) along said feed channel (19) and which each have a first helicoid (201, 211); where the first helicoid (201) of a first one (20) of said transfer augers (20, 21) has a direction opposite to that of the first helicoid (202) of the second one (21) of said transfer augers (20, 21); where said loading portion (191) faces the discharge mouth (141) of said discharge duct (14) in order to receive material from the latter,
wherein said transfer augers (20, 21) have a second helicoid (202, 212) and a helicoid-free section (203, 213), wherein each of said transfer augers (20, 21) has its first helicoid (201, 211) which has an opposite direction to that of its second helicoid (202, 212); said transfer augers (20, 21) have said first helicoid (201, 211) which extends from said loading portion (191) to a first end of said feeding portion (192), said helicoid-free section (203, 213) which faces said feeding portion (192) and said second helicoid (202, 212) which extends from a second end of said feeding portion (192), where said second end is opposite to said first end.

16. The apparatus (10) according to claim 15, wherein said discharge duct (14) has a development axis (B) and said central auger (15) has an operating axis (A) along which it extends and about which it is rotatable; said central auger (15) being fixed to said hopper (12) so that the operating axis (A) of said central auger (15) is inclinable with respect to the development axis (B) of said discharge duct (14) so as to adapt an arrangement of said central auger (15) inside said discharge duct (14) in the presence of bulky and high-hardness objects in the material pushed by said central auger (15) through said discharge mouth and the apparatus further comprises a support (121) which connects said central auger (15) to said hopper (12), said support (121) being configured so as to define a fulcrum (F) for said central auger (15), with respect to which the latter can be tilted; wherein said fulcrum (F) lies on the development axis (B) of said discharge duct (14).

17. The apparatus (10) according claim 15, wherein:
said discharge duct (14) has a development axis (B) and said central auger (15) has an operating axis (A) along which it extends and about which it is rotatable; said central auger (15) being fixed to said hopper (12) so that the operating axis (A) of said central auger (15) is inclinable with respect to the development axis (B) of said discharge duct (14) so as to adapt an arrangement of said central auger (15) inside said discharge duct (14) in the presence of bulky and high-hardness objects in the material pushed by said central auger (15) through said discharge mouth; and
said discharge duct (14) has a cylindrical internal wall (142) having a diameter of between 550 mm and 800 mm; where said central auger (15) has a first portion (151) which extends through said discharge duct (14) and which has an external diameter of between 500 mm and 700 mm; where the difference between the diameter of said internal wall (142) and the diameter of said first portion (151) is between 50 mm and 100 mm.

18. The apparatus (10) according to claim 15, wherein:
wherein said discharge duct (14) has a development axis (B) and said central auger (15) has an operating axis (A) along which it extends and about which it is rotatable; said central auger (15) being fixed to said hopper (12) so that the operating axis (A) of said central auger (15) is inclinable with respect to the development axis (B) of said discharge duct (14) so as to adapt an arrangement of said central auger (15) inside said discharge duct (14) in the presence of bulky and high-hardness objects in the material pushed by said central auger (15) through said discharge mouth; and
the operating axis (A) of said central auger (15) is inclinable with respect to the development axis (B) of said discharge duct (14) through an angle of not more than 5°.

19. The apparatus (10) according to claim 15, further comprising means for operating said central auger (15) and said lateral augers (16, 17) which are configured and/or set in such a way as to operate said central auger (15) at a rotation speed of between 8 rpm and 10 rpm.

20. The apparatus (10) according to claim 15, wherein the first helicoid (201, 211) of said transfer augers (20, 21) has a diameter of between 250 mm and 500 mm.

* * * * *